United States Patent
Bermudez Rodriguez et al.

(10) Patent No.: US 9,877,438 B2
(45) Date of Patent: Jan. 30, 2018

(54) SEGMENTED VARIABLE RATE DRIP IRRIGATION

(71) Applicant: International Business Machines Corporation, Armonk, NY (US)

(72) Inventors: Sergio A. Bermudez Rodriguez, Boston, MA (US); Hendrik F. Hamann, Yorktown Heights, NY (US); Levente Klein, Tuckahoe, NY (US); Michael A. Schappert, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 14/565,515

(22) Filed: Dec. 10, 2014

(65) Prior Publication Data

US 2016/0165817 A1 Jun. 16, 2016

(51) Int. Cl.
*B05B 15/00* (2006.01)
*A01G 25/02* (2006.01)

(52) U.S. Cl.
CPC .................. *A01G 25/02* (2013.01)

(58) Field of Classification Search
CPC ...... A01G 25/02; A01G 25/023; A01G 25/16; A01G 25/165; A01G 25/167
USPC ....... 239/542, 569, 578, 550, 556, 562, 565, 239/568, 159, 161, 163, 169, 170, 176; 137/1, 8, 9, 13, 803–842, 89, 98–101.21
See application file for complete search history.

(56) References Cited

U.S. PATENT DOCUMENTS

| | | | |
|---|---|---|---|
| 5,193,744 A * | 3/1993 | Goldstein | A01G 25/16 239/304 |
| 6,314,979 B1 * | 11/2001 | Lips | A01C 23/042 137/205.5 |
| 6,431,213 B1 | 8/2002 | Rossato | |
| 6,540,158 B1 | 4/2003 | Vered | |
| 7,108,205 B1 | 9/2006 | Hashimshony et al. | |
| 7,406,363 B2 | 7/2008 | Doering et al. | |
| 7,588,200 B2 | 9/2009 | Callies et al. | |
| 7,899,580 B2 | 3/2011 | Cardinal et al. | |
| 2005/0199842 A1 * | 9/2005 | Parsons | A01G 25/16 251/129.04 |
| 2006/0054214 A1 * | 3/2006 | Caamano | A01G 25/16 137/78.3 |
| 2006/0144437 A1 * | 7/2006 | Dresselhaus | A01G 25/167 137/78.3 |

(Continued)

OTHER PUBLICATIONS

Hamann et al., "Irrigation System", U.S. Appl. No. 13/792,751, filed Mar. 11, 2013, 28 pages.

(Continued)

Primary Examiner — Arthur O Hall
Assistant Examiner — Adam J Rogers
(74) Attorney, Agent, or Firm — L. Jeffrey Kelly

(57) ABSTRACT

A segmented variable drip irrigation system, comprised of a first horizontally disposed conduit and a second horizontally disposed conduit encompassing the first horizontally disposed conduit. The first horizontally disposed conduit passes through a forward end section, a middle section and exits through a rear end section of the second horizontally disposed conduit. The second horizontally disposed conduit contains a drain mounted to its end, at least one flow control valve and a plurality of drip emitters connected to the second horizontally disposed conduit.

16 Claims, 5 Drawing Sheets

(56) References Cited

U.S. PATENT DOCUMENTS

| | | | |
|---|---|---|---|
| 2011/0079654 A1* | 4/2011 | Bailey | A01G 25/16 239/1 |
| 2012/0037729 A1* | 2/2012 | Lee | F16K 31/0675 239/569 |
| 2013/0248622 A1* | 9/2013 | Kim | B29C 47/0038 239/542 |

OTHER PUBLICATIONS

Coates et al., "Design of a System for Individual Microsprinkler Control", 2006, pp. 1-21.

Coates et al., "Control of individual microsprinklers and fault detection strategies", Precision Agric, 2006, vol. 7, Springer Science+Business Media, LLC, DOI 10.1007/s11119-006-9001-1, pp. 85-99.

Coates et al., "Wireless Network for Individual Emitter Control in Irrigation", University of California, Department of Biological & Agricultural Engineering, Davis, California, USA, 2006, 6 pages.

\* cited by examiner

SEGMENTED VARIABLE RATE DRIP IRRIGATION

BACKGROUND

The present invention relates to an irrigation system and, in particular, it concerns a modular segmented irrigation system for a variable rate drip irrigation.

In the field of drip irrigation, there is a natural tendency towards non-uniform release of water along the length of an irrigation tube due to variations in supply pressure. Pressure loss due to energy losses may result in an uneven discharge along the length of a tube. The common approach to ensuring a roughly uniform distribution of water along the length of the system usually involves installation of pressure-regulating drip emitters on the tube wall. Installation of pressure-regulating drip emitters may contain many drawbacks associated with already existing systems. Such customization significantly increases the overall cost of a system based on the system's specific manufacturing requirements and the technical expertise required for a proper installation. The installation process of the pressure regulating emitters is complicated by the need to deploy such components along the existing tube while ensuring that the perforation along the tube wall is spatially coordinated with the emitter positions. An improper placement of emitters may significantly decrease system performance or even render it inoperable. Furthermore, utilizing such drip emitter does not address the problem of sectional irrigation, wherein certain crop along the irrigation system may requires more water than others.

Similarly, retrofitting an existing system to segment specific irrigation may rely heavily on the utilization of electronic controls. Such approach usually requires a complete replacement of existing valves and tubing elements, in turn, significantly increasing the cost of implementation. The arrangement of conventional segment specific irrigation systems is both, complicated and expensive due to the underground distribution of electrical wiring along the water distribution network. Typically, this power comprises 110 AC, which must be converted into direct current potentials in order to power the communication subsystems of the receivers and the remote controlled valves. Implementing electrical control may also double the number of valves required for directional control within the system. For example, a conventional segment specific system may require four valves for each segment in order to direct the water flow between individual segments. Such implementation is likely to include a set of inlet and outlet valves placed on each end of individual segment, leading to a significant increase in the overall cost.

Utilization of a segment specific irrigation system on a typical 18 hole golf course may require between 1000 and 1500 remote control valves in order to provide sufficient water delivery. Proper cable installation on such a system may require between 100,000 to 500,000 feet of wire, further increasing the system cost, and complexity of installation.

Due to the limitations of existing systems, various other attempts have been made to provide uniform flow to a specific segment within a system. An alternative approach to segment specific irrigation is the use of porous-wall irrigation tubes. These tubes are particularly implemented in a subterranean use due to their porous properties. The porous sidewalls are not compromised by the presence of mud and dirt, and therefore offer advantages of reduced evaporation losses, and proximity to the roots. However, such porous irrigation tubes also suffer from a pronounced problem of non-uniform flow rates, with greater amounts of water being released towards the higher pressure supply end of the line than the segments towards the end of the system. The difficulty in repairing and maintaining a subterranean system may also serve as a deterrence in implementation of such systems.

There is, therefore, a well defined need in the art for a modular segment specific irrigation system, implementing a manufactured tube structure with less elements while producing relative uniform release of water along the length of the segment, wherein the system can be easily adjusted according to the crop's growth cycle.

SUMMARY

Embodiments of the present invention disclose a system for a segmented variable drip rate irrigation system. A segmented variable drip irrigation system comprises a water supply pipe fluidly connected to a first horizontally disposed conduit. The first horizontally disposed conduit extends along and span of the irrigation system and is adapted to carry fluid. A second horizontally disposed conduit encompasses the first horizontally disposed conduit, where the first horizontally disposed conduit passes through a forward end section, a middle section and exits through a rear end section of the second horizontally disposed conduit. The segmented variable drip irrigation system comprises at least one drip irrigation nozzle which is vertically mounted to a bottom section of the second horizontally disposed conduit. The system also comprises a drain mounted near the end section of the second horizontally disposed conduit, at least one flow control valve to regulate the fluid flow, an inlet conduit fluidly connected to the first horizontally disposed conduit, and the at least one flow control valve, and an outlet conduit fluidly connected to the at least one flow control valve and the second horizontally disposed conduit.

DETAILED DESCRIPTION

Figure 1:
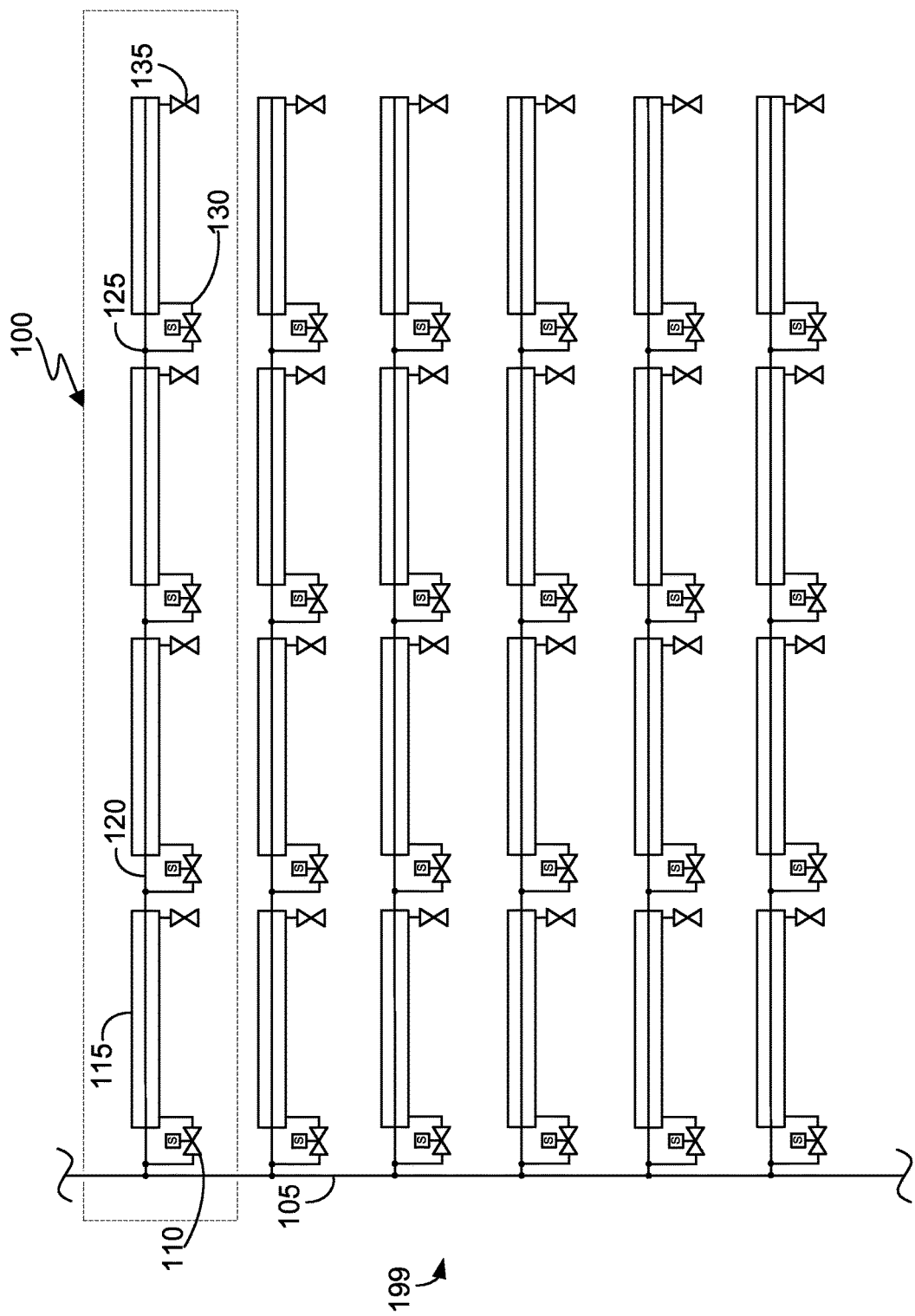
FIG. 1 is a schematic representation of an irrigation system, in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a schematic representation of an irrigation system, in accordance with an embodiment of the present invention. The irrigation system 199 may be modularly assembled over a large area, such as a farm or field that requires a variable water delivery to different segments of the field. The irrigation system 199 may include multiple delivery sections 100, a plurality of external irrigation tube 115 that can be controlled by solenoid valves 110 disposed along each of the multiple water tubes 120, and a main water distribution line 105. Each of the multiple water delivery sections 110 is fluidly coupled to the water distribution line 105 wherein the water distribution line 105 provides a fluid, such as water, to each of the multiple water tubes 120 as a pressurized fluid.

Each delivery section 100 may receive fluid supply from the main water distribution line 105 via water tube 120. The water tube 120 may be fluidly coupled to the main water distribution line 105 and extend through the length of the delivery section 100. The water tube 120 extends through the inside section of the external irrigation tube 115 entering on the first tube end of the external irrigation tube 115 and extending past the second tube end. The water tube 120 may be configured to run through both tube ends of the external irrigation tube 115 while maintaining waterproof connections between the two. Such connection may allow for a complete fluid separation between the fluid inside the water tube 120 and the internal chamber shell of the external irrigation tube 115. The water tube 120 may also contain an inlet branch 125, an outlet branch 130, and a solenoid valve 110. One side of the inlet branch 125 may be physically connected to the water tube 120 while the opposite end of the inlet branch 125 may terminate on the inlet side of the solenoid valve 110. The outlet side 130 may physically connect to the outlet side of the solenoid valve 110 and terminate along the wall of the external irrigation tube 115. Such connection may allow fluid to enter the chamber shell of the individual external irrigation tube 115.

The fluid makes a pass flow through the chamber shell of the external irrigation tube 115 to the inlet branch 125, enters the solenoid valve 110 and then exits through the outlet branch 130 into the chamber shell of the external irrigation tube 115. With all of the solenoid valves 110 in a closed position the fluid supplied to the water tube 120 may isolate the system and create constant pressure within all of the delivery sections 100 of the irrigation system 199. The solenoid valves 110 along the water tube 120 control water flow for each external irrigation tube 115. In an exemplary embodiment the external irrigation tubes 115 may contain emitters that have different emission rates along the line. The emitters with a higher emission rate may be positioned farther from the main water distribution line 105 while the emitters with a smaller emission rate may be closer to the main water distribution line 105. The emitters may be inserted such that their emission rate increases from low to high along the delivery section 100 with the low emission rate emitters being positioned closer to the main water distribution line 105. Thus, by controlling the solenoid valves 110 open/closed position for different periods of time, the amount of water delivered to a specific location can be increased or decreased.

The external irrigation tube 115 includes a drain valve 135 allowing for draining of the chamber shell. The corresponding drip valve may be disposed in a substantially horizontal orientation, for example, extending along a plane of the irrigated region wherein the external irrigation tube 115 extends in a substantially vertical orientation. In other embodiments of the invention, the external irrigation tube 115 may extend horizontally along the length of delivery section 100. The variable size of the external irrigation tube 115 can be determined by the individual needs of the irrigation plot, such as soil moisture content, plot size, and type of crop.

The water tube 120 may also include a check valve (not shown) coupled between each external irrigation tube 115. A single check valve may also be installed between the main water distribution line 105 each three way connection to each delivery section 100 to permit fluid flow in only a forward direction. As such, the check valve prohibits fluid flow in the reverse direction wherein fluid can only flow through the water tube 120 in the forward direction towards the inlet branch 125. The check valve can include a simple mechanical flap that is opened/closed by fluid pressure or a spring-loaded nozzle that is actuated by the pressure of the fluid in the water tube 120. The check valve may also include a solenoid valve that is selectively opened, or closed in a manner similar to the solenoid valve 110 as discussed above.

Figure 2:
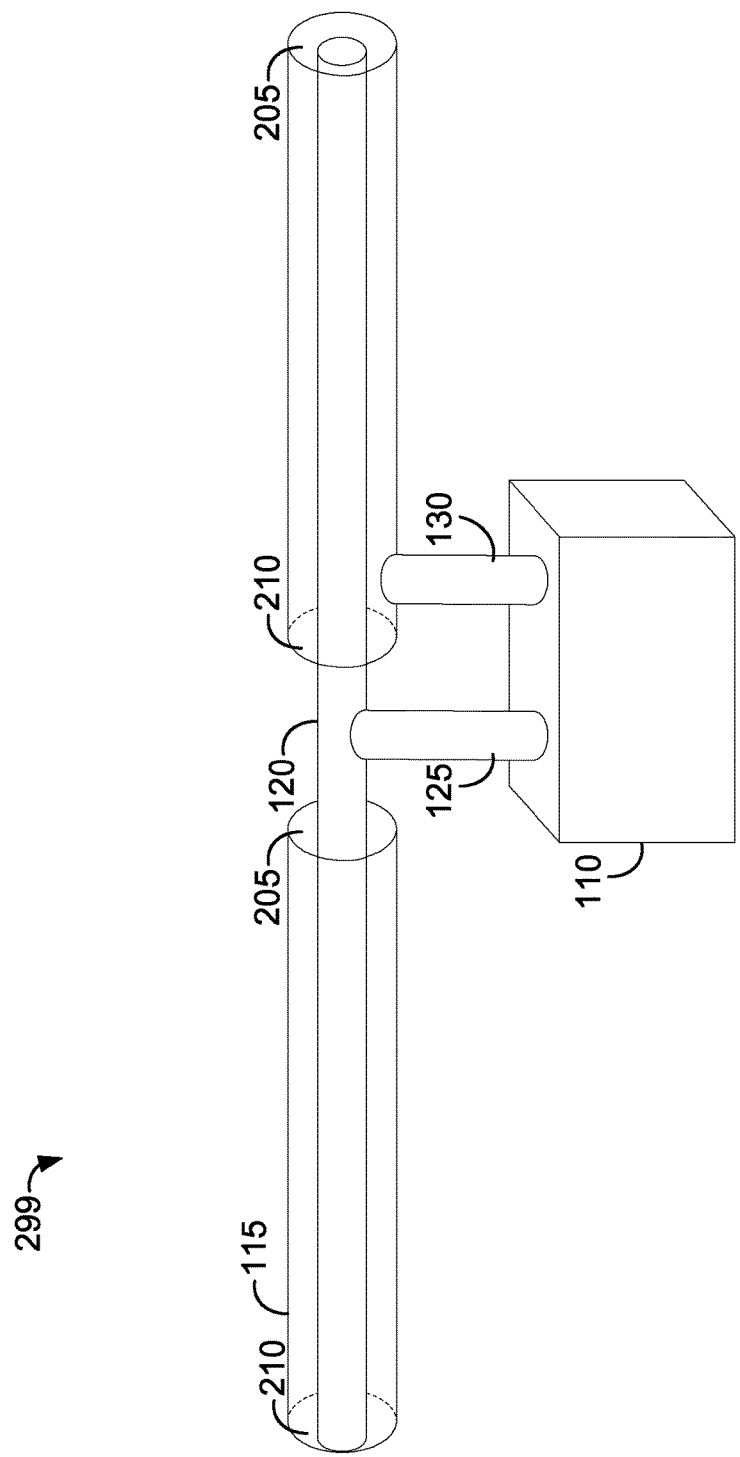
FIG. 2 is a perspective view of the external irrigation tube, in accordance with an embodiment of the invention.

FIG. 2 is a perspective view of the external irrigation tube, in accordance with an embodiment of the invention. The irrigation segment 299 comprises a water tube 120 passing through the forward end wall 210 of the external irrigation tube 115 and exiting on opposite end of the external irrigation tube 115 by means of the rear end wall 205. As shown, the water tube 120 extends forward through the external irrigation tube 115 allowing the fluids passing through the water tube 120 to be completely separated from the chamber shell of the external irrigation tube 115. Specifically, the external irrigation tube 115 forms an outer cover wrapping circularly over a section of the water pipe 120 while the perforation sections comprising of a forward end wall 210 and a rear end wall 205 may be welded or sealed as to form watertight seals connecting joints between the water tube 120 and the external irrigation tube 115. In another embodiment external irrigation tube 115 and water tube 120 may be pre-manufactured out of a single piece of material to form a "tube in tube" section.

Each external irrigation tube 115 has a remotely controlled solenoid valve 110 between such forward end wall 210 and a rear end wall 205 connecting the water tube 120 to the chamber shell of the secondary external irrigation tube 115. The valves are controlled so as to progress through a definite cycle having a plurality of steps therein by opening and closing the supply of fluid under pressure from the main water distribution line 105.

Solenoid valve 110 represents a conventional solenoid type fluid valve which may be actuated to a level sensor, a pressure sensor, timer or a remote computing control system (not shown). Preferably, the solenoid valve 110 would be located in the near vicinity of the external irrigation tube 115 to be controlled. In the complete irrigation system 199 one solenoid valve 110 may be provided for each external irrigation tube 115, unless a simultaneous opening and closing of all external irrigation tubes 115 is desired, in which case a single solenoid would be used for the group.

The system of the invention may be used in conjunction with existing manual controls such as slide gate, gate valve or other manually controlled valves. For example, a manual valve plunger may be pre-set in desired positions so that when the valve connecting the main water distribution line 105 to the water tube 120 is placed in the fully open position, the system will deliver fluid at a rate predetermined by the position of the said existing manual valves.

The fluid from the main water distribution line 105 passes through the water tube 120 to the inlet branch 125 (see FIG. 3) entering the solenoid valve 110 body. The flow of fluid is stopped by the solenoid valve 110 preferably operating in the "normally closed" position. When the solenoid valve's 110 coil is energized the solenoid valve 110 cycles open allowing fluid to flow pass the operating plunger through the outlet branch 130 and into the chamber shell of the external irrigation tube 115. The discharging fluid fills the chamber of the external irrigation tube 115 and begins precipitating unto desired irrigation area through emitters attached to the bottom section of the external irrigation tube 115.

Figure 3:
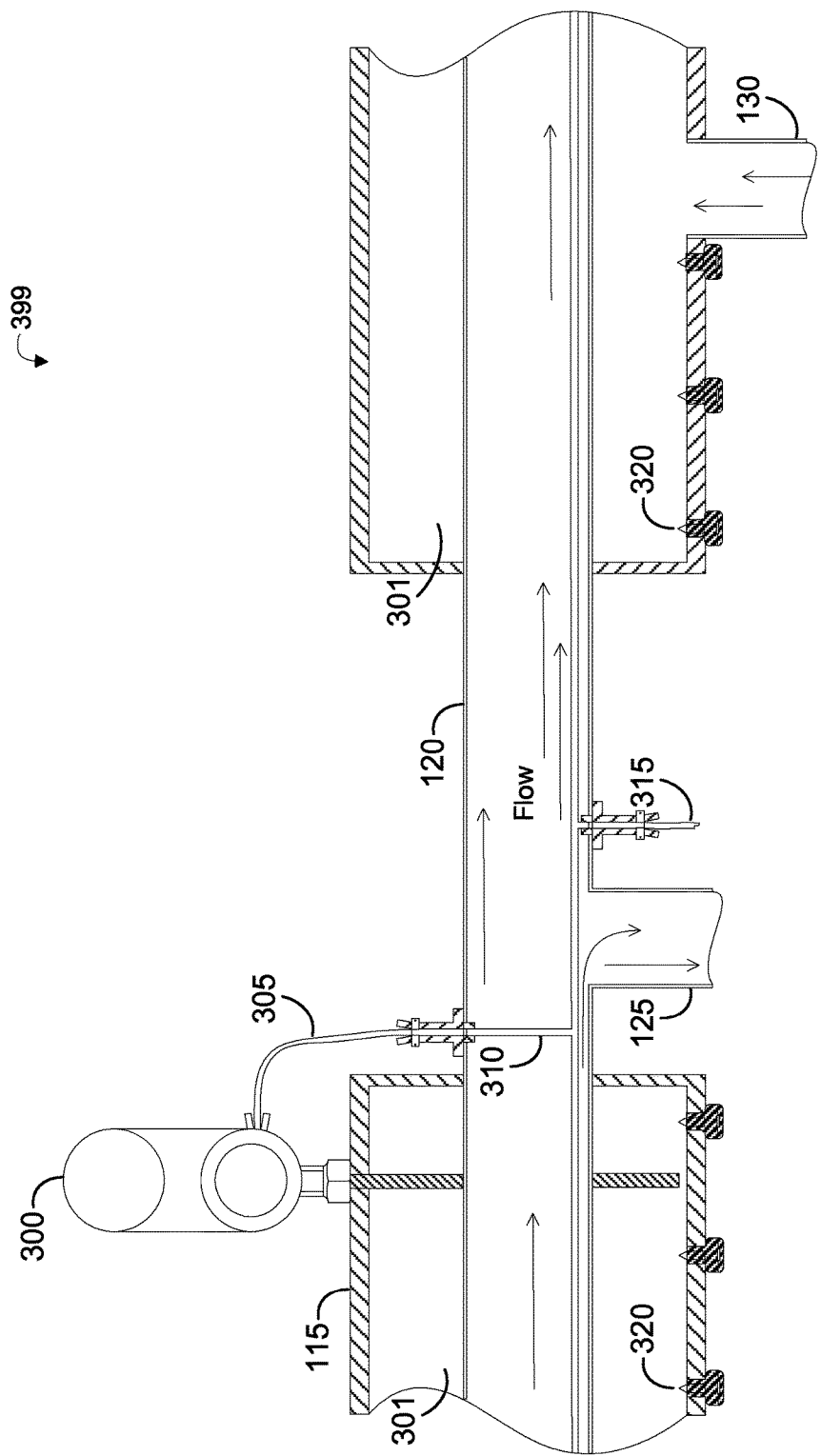
FIG. 3 is a cross sectional view of a segment, in accordance with an embodiment of the present invention.

FIG. 3 is a cross sectional view of a segment connection 399, in accordance with an embodiment of the present invention. Irrigation segment 199 includes an external irrigation tube 115 wrapping around along the length of water tube 120 fluidly coupled to an inlet branch 125.

Electronic sensors 300 can be located anywhere within the chamber shell 301 of the secondary external irrigation tube 115, or along its length and provide information regarding the status of the fluid matric potential in the individual external irrigation tubes 115. An example of such fluid metric potential may be the volume entering and leaving the system. Sensing fluid volume may allow the system to operate continuously under a safe functioning range of crop saturation. Mechanical control through electronic sensors 300 may also be implemented by controlling the water input/output status level in the external irrigation tubes 115. As discussed above, the electronic sensor 300 may be configured to sense volume of fluid entering the chamber shell 301. When a specific fluid level within the chamber shell 301 is attained, the electronic sensor 300 may provide information through a control bus 310 to a sensing module and computer control module (further discusses in FIG. 4) which may in turn close the solenoid valve (not shown in FIG. 3) feeding that external irrigation tube 115.

The control bus 310 may run inside the water tube 120 in order to provide a modular system where different segments may be replaced with minimal effort. The lines of the control bus 130 may be coupled to a sensing module, a computer control module and the actuators of a solenoid valves (not shown in FIG. 3). The control bus may provide power and control signals to the actuators of a solenoid valves (not shown in FIG. 3). The control signals could include signals to change the states of the solenoid valves (not shown in FIG. 3), from an open state to a closed state and vice versa.

Power can also be carried over the control bus 310 to the solenoid valves (not shown in FIG. 3) via a power cable 315. The power supplied by the power cable 315 can be used by the valves to energize, or de-energize its solenoid for opening and closing the valves and for powering electronics, if any, within the valves and sensors. For example, a user may desire to manually stop the fluid flow to an individual external irrigation tube 115. The user would initiate an action, such as pushing a button, to close a circuit from the computer control module to change the state of the solenoid valve from open to close. The signal to direct the necessary power to the solenoid valve to close the solenoid valve may be supplied by the power cable 315.

The control bus 310 may comprise several circuit wires gathered together in cable form, such as a data cable 305 and the power cable 315 and conducted through suitable dust and moisture tight conduit inside the water tube 120 leading outwardly along the length of the water tube 120 to the several electrically actuated devices. The connection of the wires within the control bus 310 can be made in a watertight junction box, or it can be made by watertight connector to provide protection from the fluid inside water pipe 120 and allow for easier maintenance and replacement of segments in the system.

A plurality of drip emitters 320 may be mounted on a bottom section of the external irrigation tube 115 and receive a supply of fluid from the chamber shell 301. An inlet section located within the chamber shell 301 is fluidly sealed and joined to the side wall of the external irrigation tube 115 to provide a watertight connection. The sealing may be accomplished, for example, through bonding, a threaded connection, or ultrasonic welding where the drip emitters 320 are molded from a thermoplastic material or are manufactured as part of the external irrigation tube 115. The drip emitters 320 operate to gravitationally pass fluid contained in the chamber shell 301 through the bottom section of the external irrigation tube 115 while dispersing the fluid in small droplets over the irrigation site.

Figure 4:
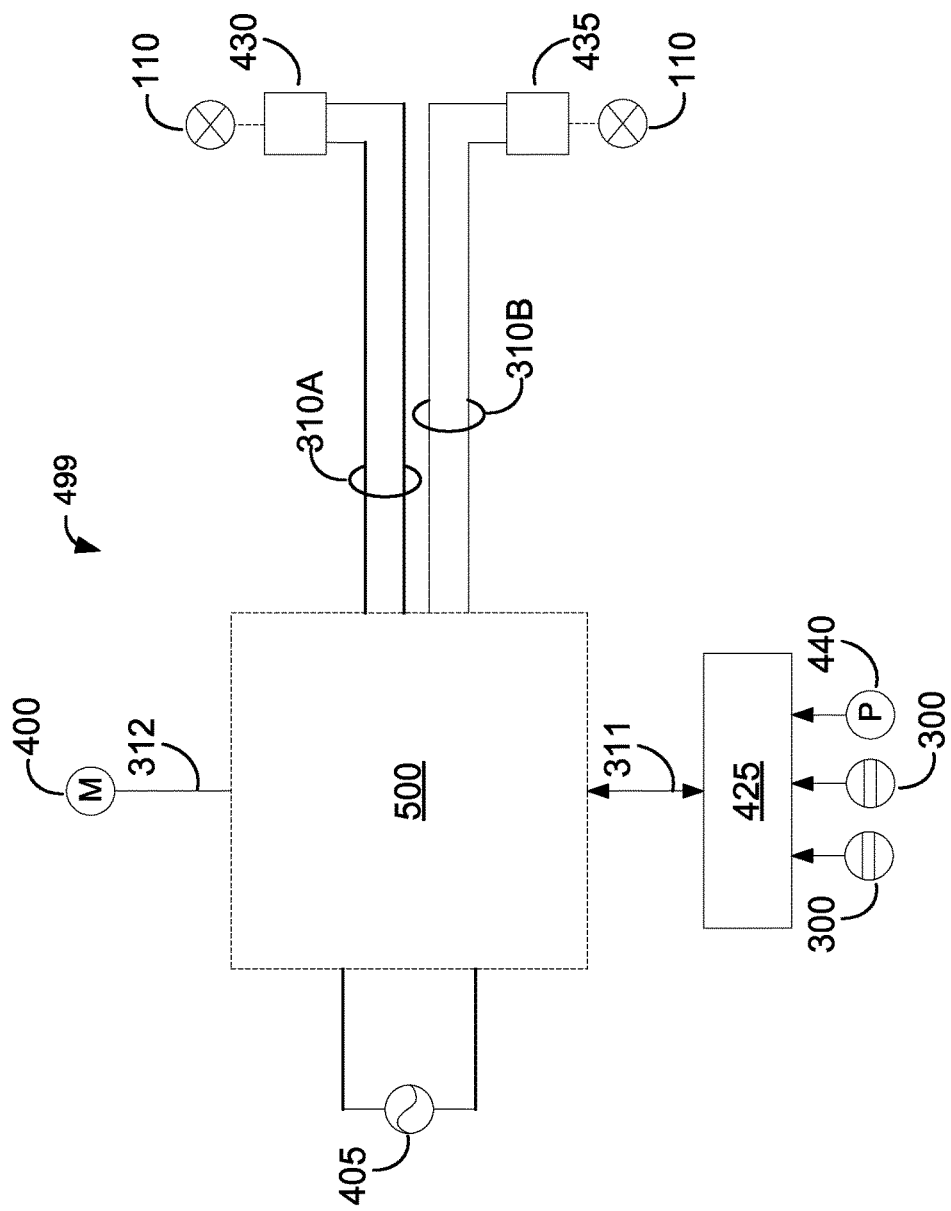
FIG. 4 illustrates a power and communication diagram, in accordance with an embodiment of the present invention.

FIG. 4 illustrates a power and communication diagram, in accordance with an embodiment of the present invention. A computer control module 500 is in communication with a sensing module 425 via communication connection 311 and transmits data, and device information from level sensors 300, pressure sensors 440, or other sensing devices within a system 499 to the sensing module 425. Using this device data, the computer control module 500 transmits communication data such as commands, for example to open or close solenoid valves 110 to specific device decoders located in specific delivery section, such as decoder 430, or decoder 435.

In one example embodiment, the computer control module 500 receives power from a power source 405. The computer control module 500 may selectively apply potentials to wires within control bus 310A and 310B. The computer control module 500 may also be equipped to detect current drawn by the individual delivery section decoders 430, or 435, and utilize that information to ensure proper operation of the system 499. Decoders 430, and 435 may be connected to individual solenoid valves 110 within the system 499, in parallel to the wires within control buses 310A and 310B, and may be arranged to operate the system components such as the depicted solenoid valves 110. Other auxiliary devices such as watering station sensors, pressure sensors, or level sensors may also utilize decoders to operate the system 499. While wires within control buses 310A and 310B are described as two, single wires, it should be understood that these wires may be made up of multiple wires connected together in series referring to different conductive, electrical paths.

The computer control module 500 may also be connected to a pump 400 through a pump control bus 312. The pump control bus 312 may allow computer control module 500 to operate pump 400 on, and off and return electrical signals pertaining to the devices operation. For example, the computer control module 500 may sense a dropping pressure from pressure sensors located within the main water distribution line 105 of system 499. It may actuate the pump 400 by transmitting a command pulse train over pump control bus 312. The command train begins with a no-power segment in which the wires of pump control bus 312 are both grounded for $\frac{1}{120}$ second. This may be followed, in the preferred embodiment, by eight pulses separated by similar no-power segments. The pulses received by pump 400 controls may be either positive voltage (signifying a "1"), or negative (signifying a "0"). Taken together, the pump controls may read the number of pulses to define the desired runtime in minutes or seconds in order to increase pressure within the main water distribution line 105. In another example, the computer control module 500 may sense a dropping pressure from a sensing module 425 via communication connection 311 in an external irrigation tube 115. The computer control module 500 may supply power to a pump control unit engaging the pump control unit's magnetic circuit breakers and closing power circuit for the pump 400. The pump 400 may operate until the sensing module 425 detects the pressure of the external irrigation tube 115 within desired operating parameters. Upon determining the pressure is within desired operating parameters, the computer control module 500 may de-energize pump control bus 312 in turn shutting the power off to the pump 400.

Figure 5:
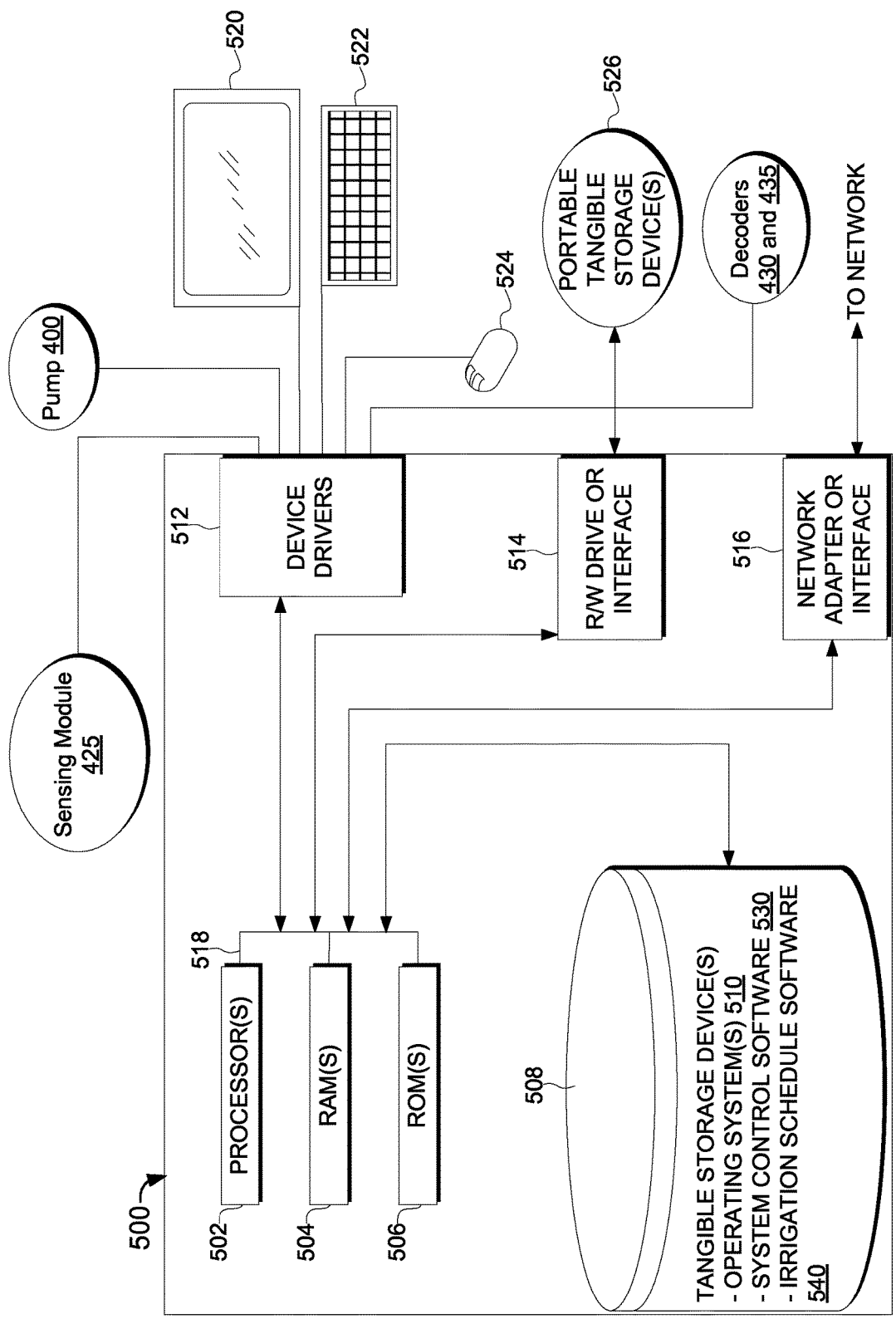
FIG. 5 is a block diagram of internal and external components within the computer control module of FIG. 4, in accordance with an embodiment of the present invention.

FIG. 5 is a block diagram of internal and external components within the computer control module of FIG. 4, in accordance with an embodiment of the present invention. It should be appreciated that FIG. 5 provides only an illustration of one implementation and does not imply any limitations with regard to the environments in which different embodiments may be implemented.

Computer control module 500 can include one or more processors 502, one or more computer-readable RAMs 504, one or more computer-readable ROMs 506, one or more tangible storage devices 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within a system.

One or more operating systems 510, system control software 530 are stored on one or more of the computer-readable tangible storage devices 508 for execution by one or more of the processors 502 via one or more of the respective RAMs 504 (which typically include cache memory). In the illustrated embodiment, each of the computer-readable tangible storage devices 508 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computer control module 500 may also contain an irrigation schedule software 540 which determines the time the solenoid valve 110 may open or close. The irrigation schedule software 540 may transmit the predetermined time to valve. The temporal period transmitted to the decoders may be input by the user or determined by the computer control module 500.

Computer control module 500 may also include a R/W drive or interface 514 to read from and write to one or more portable computer-readable tangible storage devices 526. The System control software 530 can be stored on one or more of the portable computer-readable tangible storage devices 526, read via the respective R/W drive or interface 514 and loaded into the respective computer-readable tangible storage device 508.

Computer control module 500 can also include a network adapter or interface 516, such as a TCP/IP adapter card or wireless communication adapter (such as a 4G wireless communication adapter using OFDMA technology). System control software 530 on computer control module 500 can be downloaded to the computing device from an external computer or external storage device via a network (for example, the Internet, a local area network or other, wide area network or wireless network) and network adapter or interface 516. From the network adapter or interface 516, the programs are loaded into the computer-readable tangible storage device 508. The network may comprise copper wires, optical fibers, wireless transmission, routers, firewalls, switches, gateway computers and/or edge servers.

Computer control module 500 may be connected to and receive and transmit data between a sensing module 425, pump controls 400, decoders 430 and may also include 435 a display screen 520, a keyboard or keypad 522, a microphone 525 and a computer mouse or touchpad 524. Device drivers 512 interface to display screen 520 for imaging, to keyboard or keypad 522, to microphone 525, to computer mouse or touchpad 524, and/or to display screen 520 for pressure sensing of alphanumeric character entry and user selections. The device drivers 512, R/W drive or interface 514 and network adapter or interface 516 can comprise hardware and software (stored in computer-readable tangible storage device 508 and/or ROM 506).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A segmented variable drip irrigation system comprising: one or more sections of pipe adapted to carry fluid, each section of pipe comprising:
   a first conduit inside a second conduit such that the first conduit passes through an entire length of the second conduit, wherein the first conduit of each section of pipe is capable of being removably attached end-to-end to one another such that fluid flows through consecutive sections of the first conduit and fluid is prevented from flowing between consecutive sections of the second conduit;
   a drip irrigation nozzle vertically mounted to a bottom section of the second conduit, wherein fluid is capable of flowing from the second conduit through the drip irrigation nozzle;
   a drain mounted to the second conduit near at least one end of the section of pipe wherein fluid is capable of flowing from the second disposed conduit through the drain;
   at least one flow control valve located at one end of the first conduit to regulate fluid flow from either an adjoining section of pipe or a water supply pipe each fluidly connected to the first conduit;
   an inlet conduit fluidly connected to the first conduit, and fluidly connected to a solenoid control valve;
   an outlet conduit fluidly connected to the solenoid control valve and fluidly connected to the second conduit, the solenoid control valve is capable of regulating flow from the first conduit into the second conduit through the solenoid control valve; and
   a control station operably coupled to the solenoid control valve, wherein the control station is operably coupled to one or more electronic sensors for measuring fluid metric potential, the control station dynamically monitoring the one or more electronic sensors for one or more electrical signals, the one or more electrical signals representing one or more commands for the solenoid control valve and flow control valve.

2. The system according to claim 1, wherein the second conduit comprises a cylindrical enclosure over a section of the first conduit.

3. The system according to claim 2, wherein the first conduit extending through the second conduit is fluidly sealed from the second conduit.

4. The system according to claim 1, comprising a disposable check valve located nearest to three way connection between the water supply pipe and the first conduit to permit fluid flow in only a forward direction.

5. The system according to claim 1, comprising a controllable disposable valve located nearest to connection between the water supply pipe and the first conduit to permit isolation of irrigation branches.

6. The system according to claim 1, wherein each second conduit comprises one or more flow control valves to regulate the fluid flow each individual second conduit.

7. The system according to claim 6, wherein each second conduit comprises one or more electronic sensors connected to the one or more flow control valves and a control computer.

8. The system according to claim 7, wherein a control and power cabling electrically connected to the one or more flow control valves and the one or more electronic sensors passes inside the first conduit.

9. The system according to claim 8, wherein the control and power cabling is insulated from fluids, and debris.

10. The system according to claim 9, wherein the controlling and power cabling comprises insulated connections between a plurality of sections on the first conduit.

11. The system according to claim 10, wherein the plurality of sections of the first conduit are disposable.

12. The system according to claim 1, wherein the drip irrigation nozzle is adjusted for variable fluid flow.

13. The system according to claim 1, wherein the drain comprises a solenoid control valve to flush the segmented variable drip irrigation system.

14. The system according to claim 1, wherein a computer control module operates the solenoid control valve in a closed loop configuration based on sensor feedback.

15. The system according to claim 14, wherein each of the solenoid control valve are configured to acknowledge command receipt of the one or more commands and to report that the one or more commands were performed.

16. The system of claim 1, wherein the second conduit is disposable.

* * * * *